(12) United States Patent
Gebhart et al.

(10) Patent No.: US 7,459,506 B2
(45) Date of Patent: Dec. 2, 2008

(54) SEGMENTED AGITATOR REACTOR (75) Inventors: Hermann Gebhart, Böhl-Iggelheim (DE); Karl Huber, Frankenthal (DE); Christiane Boss, Ketsch (DE); Franz Langhauser, Ruppertsberg (DE)

(73) Assignee: Novolen Technology Holdings, C.V., JJ The Hague (NL)

( * ) Notice: Subject to any disclaimer, the term of this patent is extended or adjusted under 35 U.S.C. 154(b) by 276 days.

(21) Appl. No.: 10/548,288

(22) PCT Filed: Jan. 10, 2004

(86) PCT No.: PCT/EP2004/000116

§ 371 (c)(1),
(2), (4) Date: Nov. 3, 2005

(87) PCT Pub. No.: WO2004/078329

PCT Pub. Date: Sep. 16, 2004

(65) Prior Publication Data

US 2006/0104874 A1      May 18, 2006

(30) Foreign Application Priority Data

Mar. 6, 2003 (DE) ................ 103 10 091

(51) Int. Cl.
C08F 2/00 (2006.01)
B01J 19/18 (2006.01)
B01F 9/10 (2006.01)
C08F 10/06 (2006.01)

(52) U.S. Cl. .......................... 526/64; 526/88; 526/918; 422/135; 422/225; 528/502 R; 366/325.3; 366/327.1; 366/330.1

(58) Field of Classification Search ................ 422/135, 422/243, 225; 526/64, 88, 918; 366/327.1, 366/330.1, 325.3; 528/502 R
See application file for complete search history.

(56) References Cited

U.S. PATENT DOCUMENTS

| | | | |
|---|---|---|---|
| 2,569,459 A | 10/1951 | De Voe | |
| 3,639,377 A | 2/1972 | Trieschmann et al. | |
| 3,944,534 A * | 3/1976 | Sennari et al. | ................ 526/64 |
| 4,003,712 A | 1/1977 | Miller | |
| 4,438,074 A * | 3/1984 | Wilt | ........................... 422/135 |
| 4,460,278 A | 7/1984 | Matsubara et al. | |
| 4,921,919 A | 5/1990 | Lin et al. | |

FOREIGN PATENT DOCUMENTS

| | | |
|---|---|---|
| DE | 281 168 | 12/1912 |
| DE | 1 218 265 | 12/1966 |
| DE | 28 03 407 A1 | 8/1979 |
| EP | 1 080 782 B1 | 11/2004 |
| WO | WO 97/04015 A1 | 2/1997 |
| WO | WO 97/36942 A1 | 10/1997 |
| WO | WO 99/29406 A1 | 6/1999 |

* cited by examiner

*Primary Examiner*—Fred M Teskin
(74) *Attorney, Agent, or Firm*—Foley & Lardner LLP (57) ABSTRACT

The present invention relates to an apparatus for carrying out chemical and physical processes, wherein flowable substances are mixed together, comprising a vertical, cylindrical vessel with inlets and outlets, as well as a central shaft and radial agitator blades arranged on the said central shaft and extending close to the wall. In this context, viewed in the peripheral direction, the agitator blades are curved and are combined in pairs of agitator elements one above the other to form groups, the blades of one element of the group being curved in a radially concave manner and the blades of the other element being curved in a radially convex manner.

15 Claims, 9 Drawing Sheets

Residence period performance of a conventional CSTR

CSTR: Continuous stirred Reactor
H: horizontal
V: vertical

H-CSTR

Fig. 6

Residence period performance of a loop or V-CSTR-reactor

Fig. 7a

1. Formula symbols:

| | | |
|---|---|---|
| A | Activity | [g PP/g cat*h] |
| D | Diameter | [m] |
| I | Enthalpy | [kJ/kg] |
| L | Length | [m] |
| m | Mass | [kg] |
| m' | Mass flow | [kg/h] |
| P | Productivity | [kg PP/g cat] |
| p | Pressure | [bar] |
| T | Temperature | [°C] |
| t | Time | [min] |
| V | Volume | [m³] |
| V' | Volume flow | [m³/h] |
| v | Specific volume | [m³/kg] |
| ◻ | Density | [kg/m³] |

2. Indices:

| | |
|---|---|
| B | Bulk- |
| C3 | Propylene |
| cat | Catalyst |
| gas | In relation to gas |
| i | Consecutive number for segments |
| in | In, entering |
| liquid | In relation to liquid |
| out | out, exiting |
| PP | Polypropylene |
| reac | reacting |
| S | Segment |
| Segm | Segment No. |
| [◻t] | In relation to time segment |

Fig. 8

Reactor with minimal back-mixing, 32 theoretical CSTR

SEGMENTED AGITATOR REACTOR

The present invention relates to an apparatus for carrying out chemical and/or physical processes, as well as to a process for the preparation of polyolefins.

Known reactors for the present purposes are invariably flow pipes or agitator vessels.

Ideal flow pipes offer the advantage that all transported particles are subjected to the same residence time when passing there through while this is not the case in the agitator vessel; however, in the latter the particles are mixed more effectively. If, therefore, a high degree of mixing with the same residence time of all particles is to be attained, agitator vessel cascades are used. Such agitator vessel cascades can, however, only be realised in separate vessels, involving construction costs. Both reactor types, therefore, offer only limited possibilities in each case of influencing the fluid substance particles or substance particle mixtures in solid and/or liquid form treated therein.

It is, therefore, the object of the present invention to provide a reactor for physical and/or chemical processes, combining the advantageous characteristics of a flow pipe and an agitator vessel.

This object is attained according to the invention by an apparatus for carrying out chemical and physical processes, wherein flowable substances are mixed together, comprising a preferably cylindrical (vertical) vessel with inlets and outlets, as well as a central shaft and radial agitator blades arranged on the said central shaft and extending close to the wall. Viewed in the peripheral direction, the agitator blades are curved and are combined in pairs of agitator elements (one above the other) to form groups, the blades of one element of the group being curved in a radially concave manner and the blades of the adjoining element being curved in a radially convex manner.

The specific characteristic of such a design resides in the following: The solid or liquid particles or gases passing through the tubular reactor, viewed in the direction of rotation, are displaced from the vertical central region outwardly towards the pipe wall by the concave agitator blades, while the blades shaped in an opposite sense positioned above or below the respective structural group convey these inwardly again. At the same time deflected flow lines come about on the blade edges so that the particles viewed as a whole perform a flow path of a closed helix. If a reactor of this type is not operated statically, but a vertical throughput is generated, e.g. by pumping or due to gravity, the further advantage, apart from very good mixing, of a distinctly homogeneous residence time distribution is brought about. Compared with conventional reactors, this, of course, also results in a substantially reduced reactor size.

A reactor according to the invention of this type may be used, in particular, for producing homogeneous mixtures, for performing reactions between solid and/or liquid and/or gaseous substances, for heating or cooling, for coating particles and similar uses. Its simple construction also permits, of course, processes performed under high pressure or at high temperatures.

A further, very particular advantage is provided by the possibility to influence the process in a very well defined manner.

Since, as stated above, the residence time of the particles passing through the tubular reactor is very homogeneous, various measures may also be performed at various levels, such as, for example, locally confined cooling, feeding or withdrawing materials; cross flow scrubbing with gases may, for example, be effected if solids particles are treated in the reactor or a plurality of reaction steps with various reaction components are carried out.

A further improvement, i.e., in particular, more speedy mixing and better defined residence time distribution may be attained by tapering the blades towards their free ends, e.g. by a trapezoidal configuration of the blades, taking into account the increase of the peripheral velocity in a radial direction.

Transverse feeding may also be improved by curving the blades in a helicoidal manner, preferably in the form of a logarithmic or Archimedean spiral.

Moreover, the blades may also be pitched at an angle in relation to the longitudinal axis of the shaft supporting the latter, in order to induce vertical forwarding. For example, the blades of the agitator elements may be pitched in opposite directions in such a manner that they move the substance in their range of action towards one another, in order to intensify mixing.

A further possibility of influencing the components of the reactor contents may be attained if between the individual agitator elements, i.e. between each of the agitator pairs, barrier disks are provided, guiding the substance during its passage outwardly towards the pipe wall or smoothing turbulence.

The preparation of polyolefins may be realised in a particularly advantageous manner by a reactor of this type.

In this case use is made of the effect that the action of the agitator blade groups amounts to an improved agitator vessel, stagnant zones are absent and a very high relative velocity of the reaction components monomer, polymer and catalyst prevails, so that all products leaving the first group(s), have reacted to the same extent; in particular, this also involves a more homogeneous temperature distribution as compared with the state of the art.

Conventional processes for the preparation of polyolefins, in particular polypropylene, are described in detail in the available literature.

Fluidised bed reactors, e.g.:
U.S. Pat. No. 4,003,712 by Union Carbide Corp.,
EP 1080782 by Sumitomo Chem. Corp. LTD Solvent processes, e.g.:
WO 97/36942 by Dow chem. Corp.

Circulating multi-zone reactors, e.g.:
WO 97/04015 by Monteil Technology CO BV (Basle)

Agitated gas phase reactors, e.g.:
U.S. Pat. No. 4,921,919 by Standard Oil CO
U.S. Pat. No. 3,639,377 by BASF AG Mixing elements for reactors are described e.g. in DE 1,218265 or WO 99/29406.

All processes stated have the object to withdraw reaction heat rapidly and uniformly. In fluidised bed reactors this is brought about by relatively large quantities of gas and a high relative velocity of the particles in relation to one another. A disadvantage of this process, as already mentioned above, is the high quantity of gas. For this purpose, normally a significant proportion of carrier gas is admixed to the reaction gas, which must subsequently again be recovered. Furthermore, the apparatus for generating the required high gas velocities are relatively expensive and the reactors tend to form polymer deposits.

Solvent processes suffer from the disadvantage that the solvent used must be removed and recovered from the polymer. In all processes described, the polymer is significantly back-mixed so that these may be considered as a continuously operated agitator vessel. Such back-mixed processes permit only a limited control of the polymer composition during the residence time of a polymer particle in the reaction zone. Furthermore, in such processes an appreciable proportion of the polymer particles is already removed again from the reactor at an early stage of the reaction, resulting in a relatively low catalyst utilisation.

Another essential aspect is the quantity of transition material coming about in a reactor when changing from product A to B. This quantity is determined essentially by the residence period performance of the reactor system.

Figure 5:
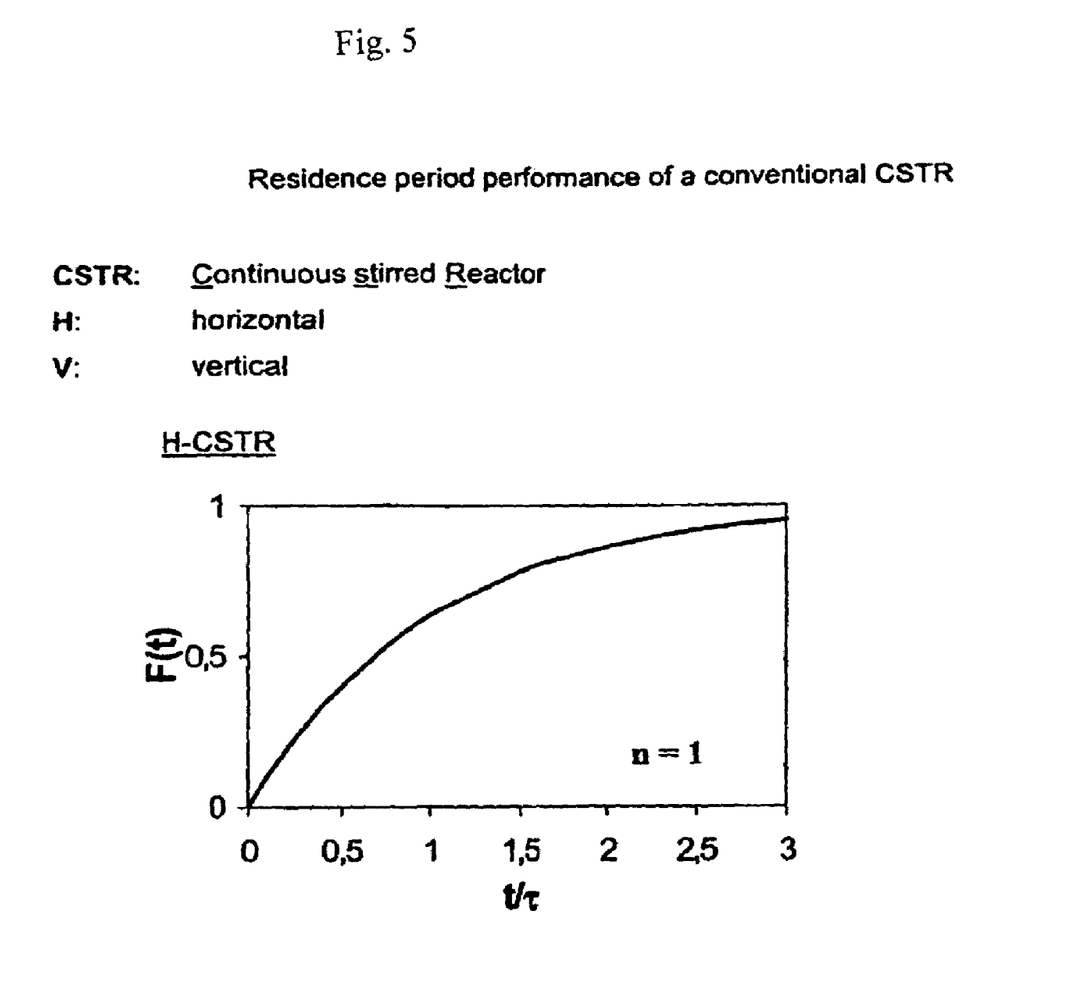
FIG. 5 is a graphical representation of the residence period performance of a conventional CSTR.

FIG. 5 shows the residence period performance of a conventional CSTR.

As shown in FIG. 5, approximately 3 residence periods are required for a product transition in a CSTR to acquire a material property F. This comes about in different manners in reactors, which, at least in part, are arranged in a cascade fashion such as e.g. loop reactors or horizontal (vertical) reactors.

Figure 6:
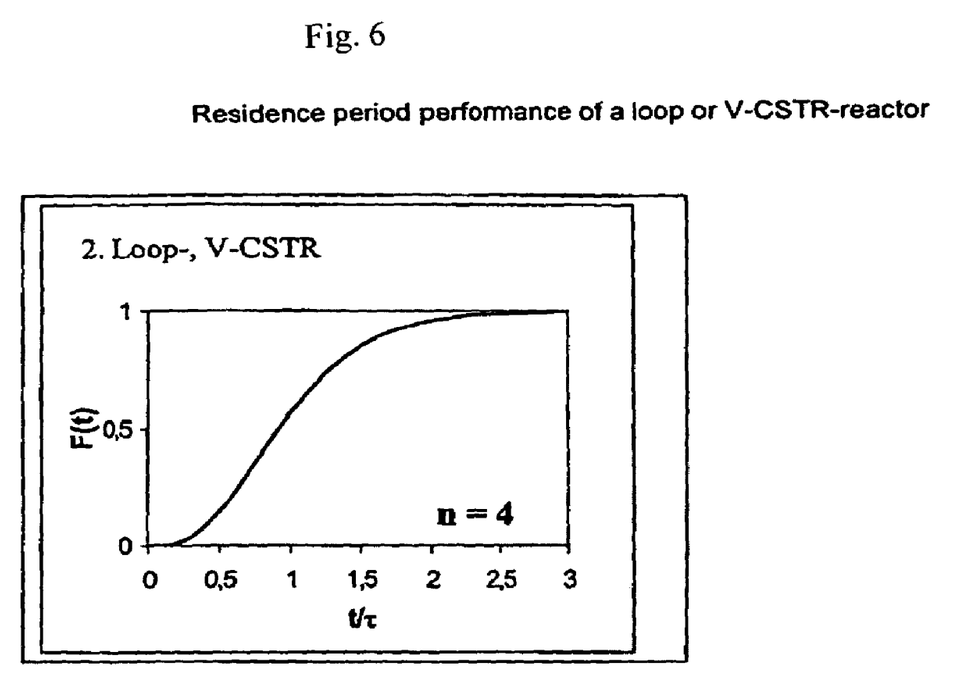
FIG. 6 is a graphical representation of the residence period performance of a loop or V-CSTR reactor.

FIG. 6 shows the residence period performance of a loop or V-CSTR reactor.

As shown in FIG. 6, the product transition regarding material property F may theoretically be performed in loop or V-CSTR reactors by a cascade of n=CSTR. It is disadvantageous that approximately 2 residence periods continue to product transition extending over the entire cascade. be necessary for a The reactor according to the invention meets the following requirements:
High relative velocity of the polymer particles in relation to one another,
High relative velocity of the polymer particles transversely to the reactor axis
Velocity of the polymer particles in reactor axis proportional to volume expansion of the polymer particles during the reaction and minimal back-mixing.

Figure 7:
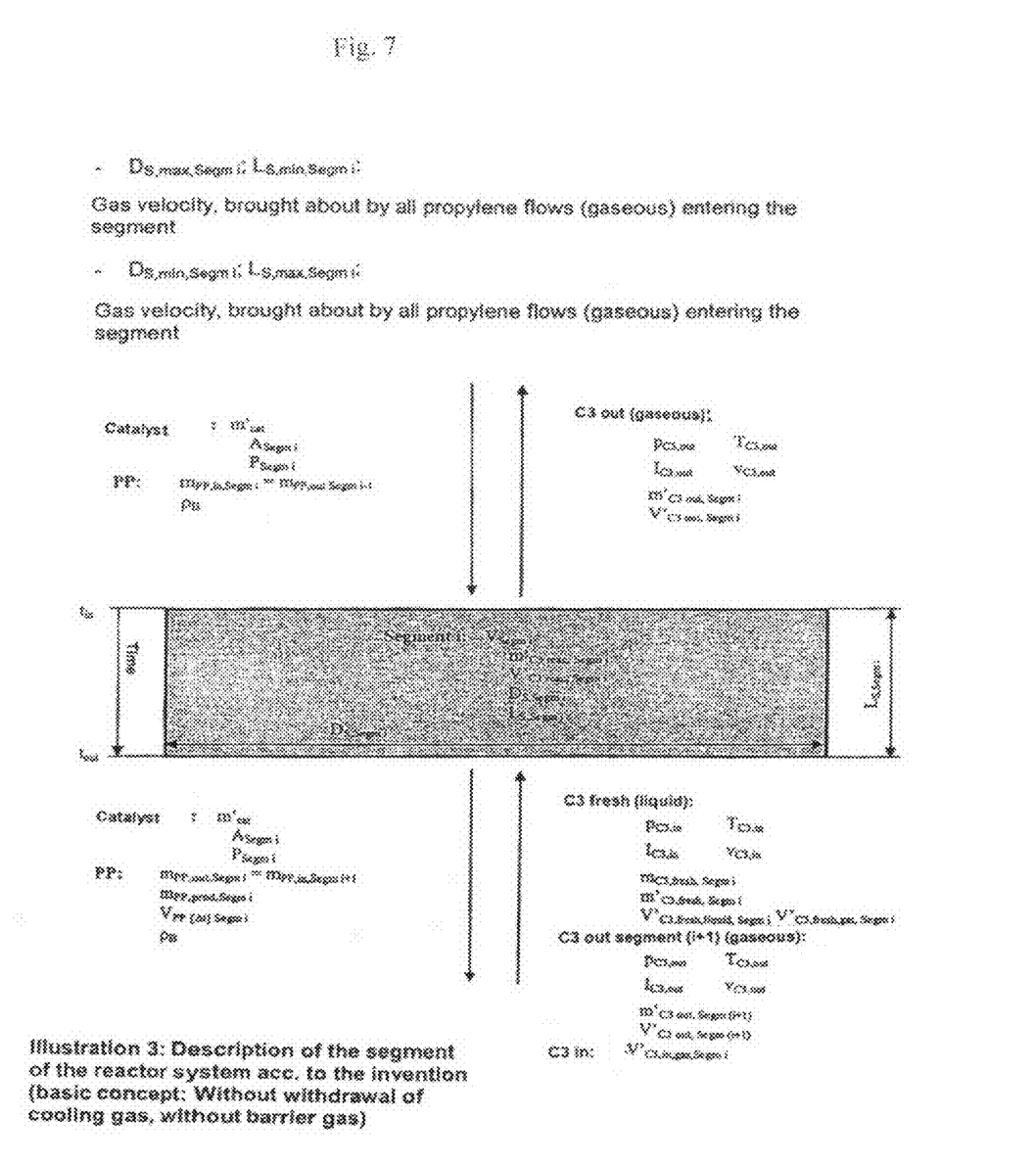
FIG. 7 is the description of the segment of the reactor system according to the invention.
Figure 7A:
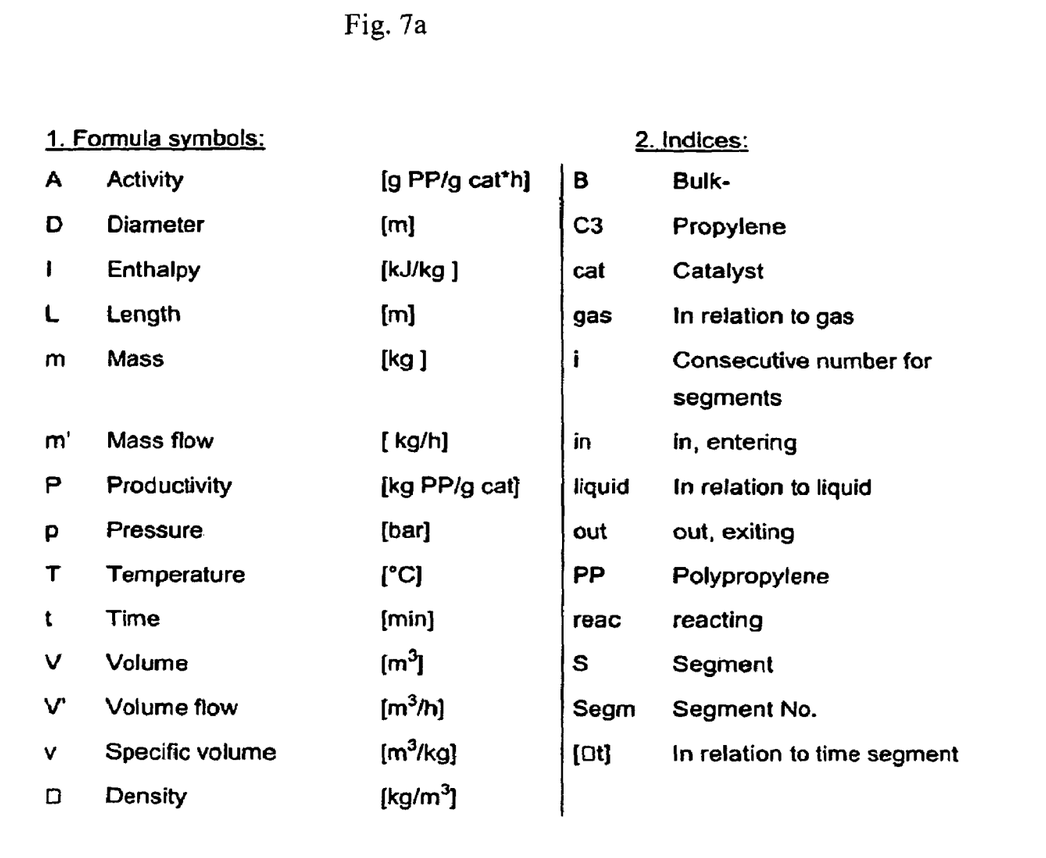
FIG. 7a is a listing of several formula symbols and definitions.

According to the above mentioned output profile a system has been developed which comprises the following characteristics: There is provided a vertical, agitated reactor, subdivided into segments (groups). For conducting the reaction, it is, in principle, irrelevant whether the main product flow is upwardly or downwardly directed. The reactor comprises at least 2, preferably 4, particularly preferably more than 12 theoretical segments, the following consideration applying to each segment (see FIG. 7).

The design of the segment depends mainly on the gas velocities. The point of operation of the reactor is in the range between the gas velocity 0 and the fluidization limit, preferably in the range of 0.5-0.8 times the gas velocity at the point of fluidization.

Figure 8:
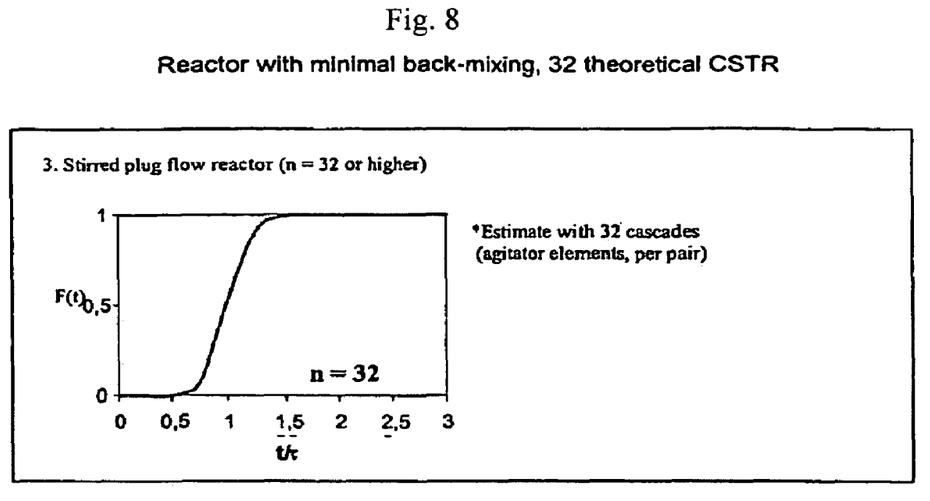
FIG. 8 is the residence period performance of a reactor system with regard to product property F.

The residence period performance of such a reactor system may be described by the graph (see FIG. 8) with regard to a product property F.

A reactor system of this type permits product transitions in less than one residence period.

Each segment is equipped with an agitator element, permitting efficient horizontal mixing and ensuring, as a result, a uniform distribution of cooling agent over the entire reaction chamber as well as a high relative velocity of the particles in relation to one another. Agitator elements permitting such a mixing pattern, may, as stated above, be, for example, in the form of a logarithmic spiral, the cross-sectional profile and design of the region at the agitator tips and the agitator axis being so configured that the mass flow remains substantially ensured in the boundary zones, i.e. in the outermost and innermost operating region of the agitator. It is particularly advantageous in this context that agitators having an Archimedean or logarithmic spiral form are self-cleaning.

The height and diameter of the segments may be adapted to the prevailing kinetics of the catalyst system by appropriately selecting the reactor geometry and the arrangement and configuration of the agitator elements.

In the region of the injection of the catalyst system a back-mixed zone may be provided for better blending in of the catalyst and for a more effective heat dissipation. In this case the agitator element is modified accordingly. For this purpose, for example agitator baffles or other internals are suited, which provide force mixing in the direction of the agitator axis.

For the withdrawal of the reaction heat liquid monomer is preferably used as the cooling agent. If appropriate, inert components not participating in the reaction process may likewise be used. In the simplest case the coolant is metered into the reactor from below and withdrawn from above, regardless of the direction of the main flow of the product. It is also possible to provide individual segments with separate dosing locations for a coolant and/or further reaction components such as monomers, catalysts, activators, inhibitors etc. In addition, it is possible to influence the gas composition by withdrawing cooling agent or reaction components within the segments. The same applies to the use of barrier agents between segments for separating gas compositions within the reactor.

The present invention is elucidated in more detail by way of the accompanying figures. There is shown in:

FIG. 1 the flow pattern compared to the state of the art,
FIG. 2 the basic structure of the reactor according to the invention and
FIG. 3 scrubbing of a polyolefin with inert gas
FIG. 4 agitator elements

Figure 1:
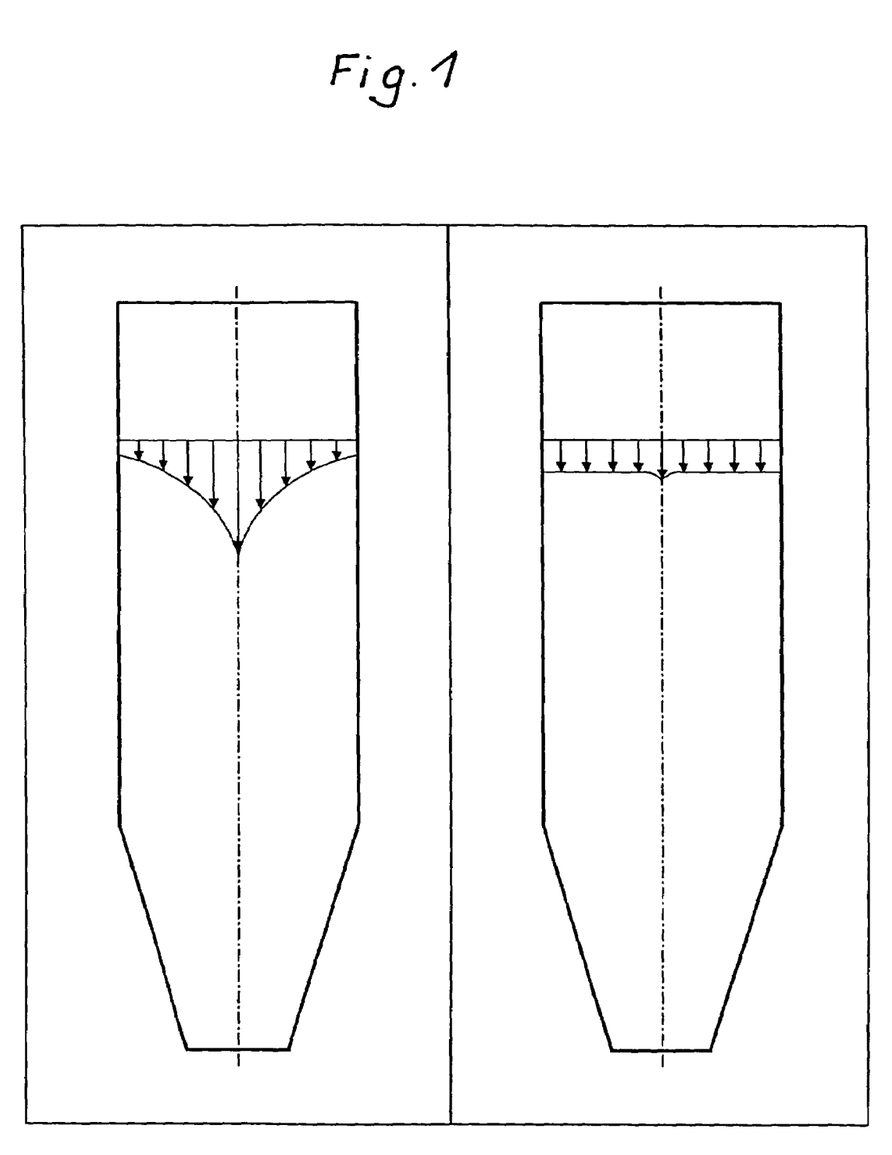

On the left hand side, FIG. 1 shows the flow characteristics of a fluid medium during its passage through an upright cylindrical vessel (1) comprising conventional central, vertical agitator elements, arranged on a driven coaxial shaft. The flow velocity decreases from the inside to the outside, mainly due to boundary friction, so that the central particles exit the reactor at a clearly earlier stage than those in the boundary region, i.e. the residence time varies considerably.

The right hand side illustration shows the effect of the process according to the invention. The flow velocity of all particles is uniform, they pass through the reactor in a closed front as a plug flow, but with continuous mixing transversely to the reactor axis. Taking into account the reaction velocity, the heat transition and the like, zones may thus be defined to which further reaction components, but also reaction inhibitors may be added from outside or via a hollow shaft; in this manner it is possible, for example, to perform multi-stage reactions in a single reactor housing or also to vary different reaction parameters such as temperature, concentration in a reactor housing.

The conditions apply both to the preferred upright as well as to a recumbent or inclined arrangement of the reactor.

Figure 2:
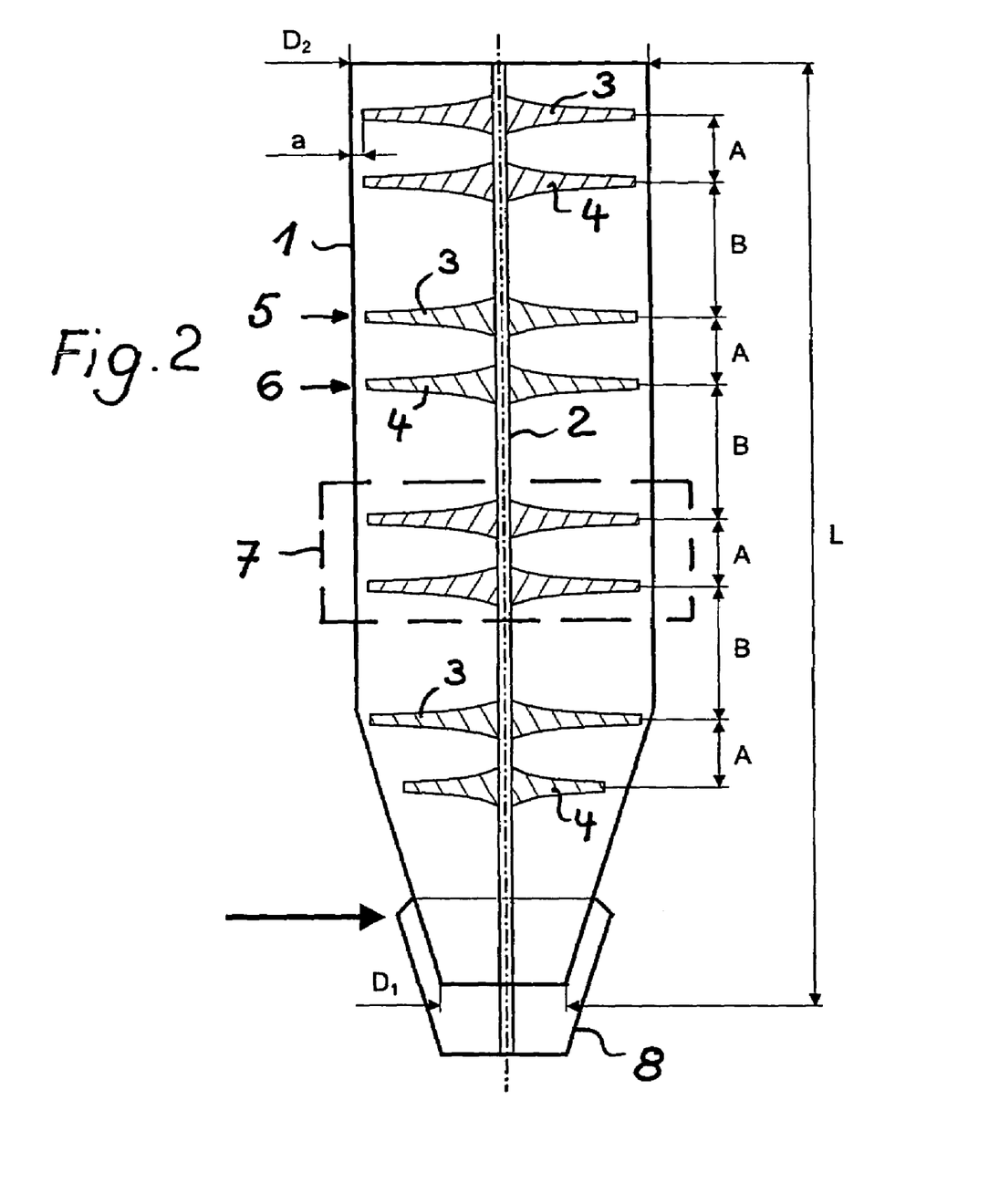

FIG. 2 illustrates the basic structure of the reactor according to the invention.

It comprises an, in particular, upright, cylindrical vessel 1 including a central shaft 2, which may be hollow. The shaft 2 supports agitator blades 3, 4 serving as agitator elements 5, 6, each of them being combined to form groups 7 positioned one above the other and interacting with one another, the blades 3, 4 being helically curved in opposite directions, so that an agitator element 5 brings about feeding directed substantially radially to the exterior, while the other agitator element 6 brings about feeding directed towards the interior. In this context, the spacing A between the agitator elements 5, 6 is advantageously less than the spacing B between the groups 7 from one another. The gap a between the agitator blades 3, 4 and the vessel wall is adapted to the size of the particles passing through the reactor, i.e. it may increase in the direction of flow with increasing particle sizes.

In order to increase the flow velocity at the reactor outlet, the latter may be designed in a conical manner in the vicinity of the bottom 8. Substances may be introduced into the process or withdrawn from the latter via a hollow shaft and corresponding outlet apertures (not shown) or via hollow agitator blades.

Figure 3:
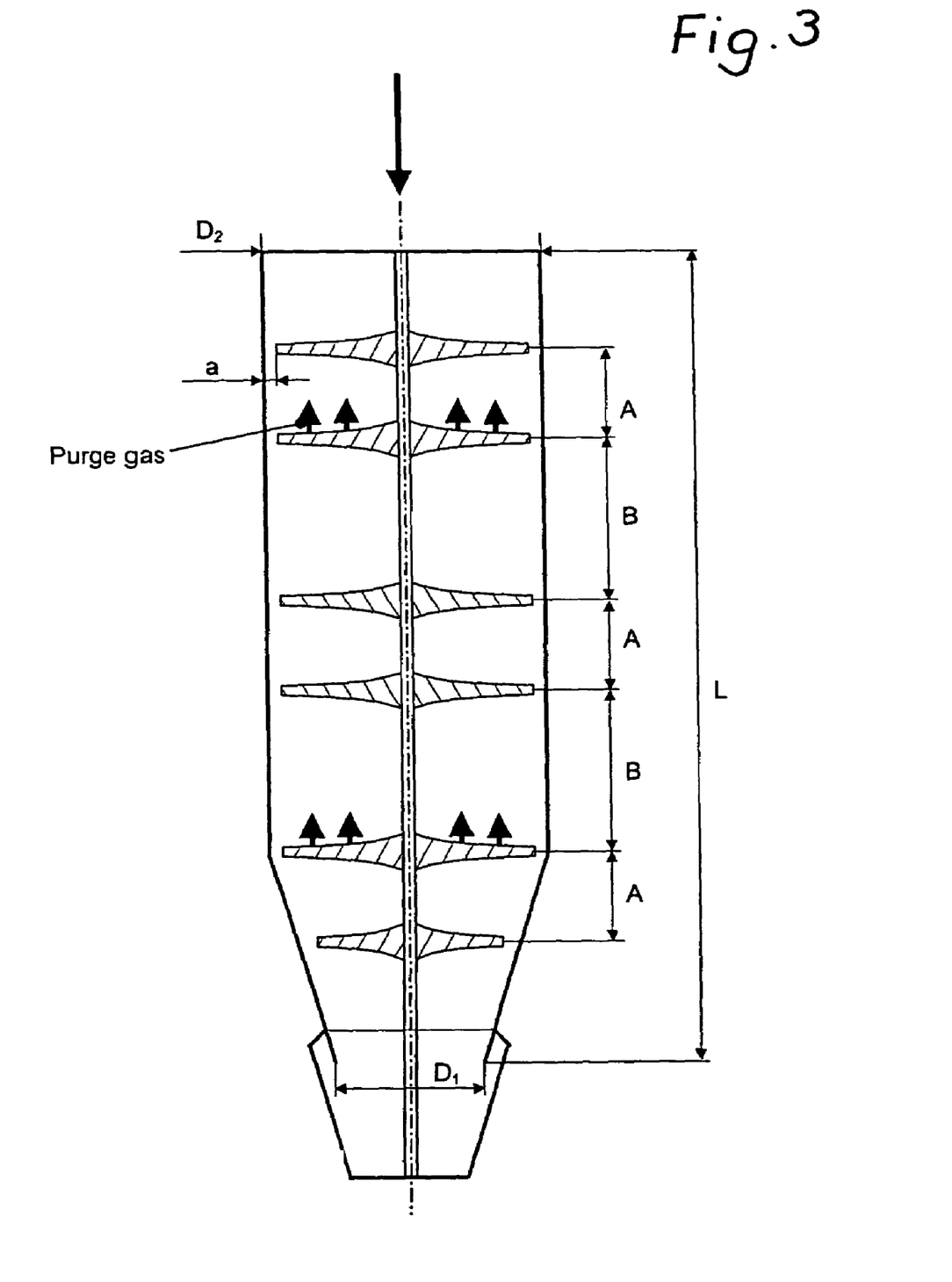

FIG. 3 shows a further application of the reactor according to the invention.

The polyolefin particles obtained by the catalytic reaction in FIG. 3 and grown to the catalyst contain non-reacted contents of gaseous monomer.

The latter must be removed prior to further processing. For this purpose the product is passed (continuously) into a second reactor, equipped with similar groups of agitator blades and scrubbed with inert gas under slight excess pressure or atmospheric pressure while being intensely agitated, the residence period performance corresponding to flow pipe conditions, in turn bringing about absolutely uniform degassing.

The inert gas ($N_2$) may be introduced in counter-current, e.g. via the bottom, or, as indicated in the present case, via a hollow shaft and the agitator blades.

In the course thereof or thereafter it is possible, in principle, to add additives to the polymer, e.g. colorants, which are in turn mixed very homogeneously with the polymer.

Figure 4:
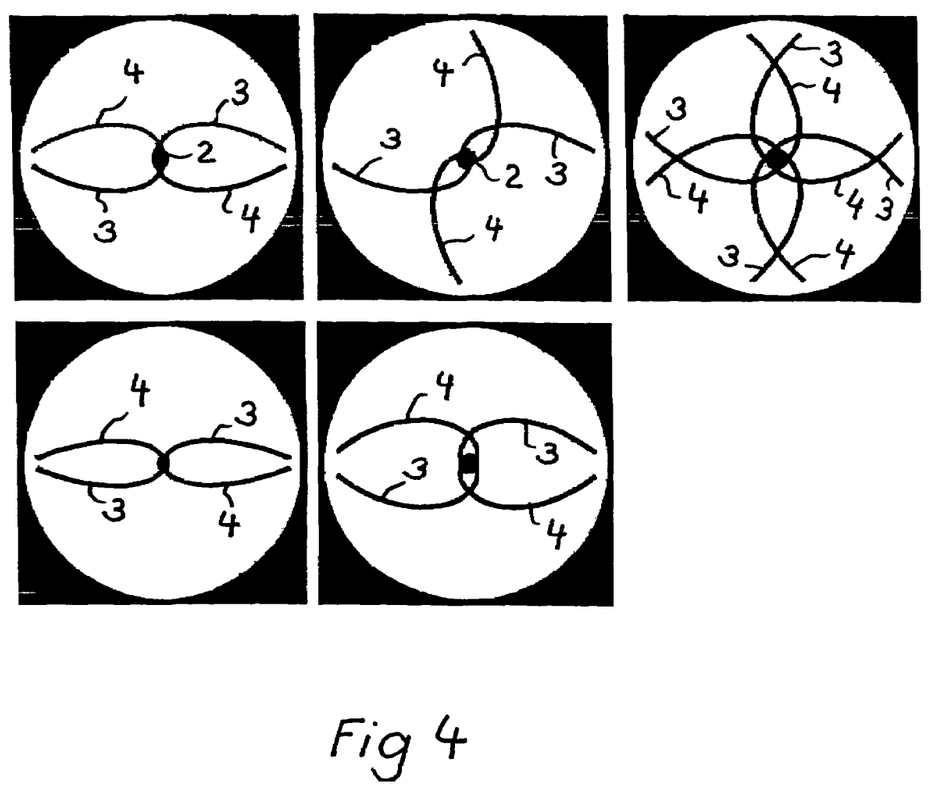

FIG. 4 shows various designs of the agitator elements in plan view, the blades 3, curved in one direction, being positioned in a plane different from that of the blades 4 curved in the opposite direction.

It is preferred to use pairs of agitator blades, which may also be arranged cross-wise. Depending on the rotation velocity, the curvatures of the blades may be designed in a more or less pronounced manner, an arrangement of the blades within a group, offset in relation to one another, in the adjoining planes being possible as well.

The following working example describes the preparation of polypropylene in a reactor, e.g. according to FIG. 2.

The raw materials used are the following:

Propylene: Preferably polymer grades having a purity of >99.8%

Catalyst: $4^{th}$ generation Ziegler catalyst or other catalysts suitable for the preparation of polypropylene Alkyl: preferably triethylaluminium Donor: Preferably a silane of the group dialkyldialkoxy silane of the general formula RR'Si(OMe)2, R, R' being equal or different, R, R'=alkyl, isoalkyl, aryl, cycloalkyl ... Cyclohexyl-methyl-dimethoxysilane was used In the present example.

Hydrogen: super pure.

In a continuously operated reactor (top down) having a length of 16.3 m and an initial diameter D2 of 1.74 as well as an end diameter of 0.7 m and an effective volume of 12 $m^3$, filled with a polymer powder of medium bulk density of 400 $kg/m^3$, the catalyst is dosed continuously from above onto the agitator bed. The catalyst is suspended in propylene and is introduced into the reactor together with pure propylene in a volume of 1 t/h as a suspension having a concentration of 10%. The agitating velocity is 24 rotations/minute. Likewise from above triethylaluminium (alkyl) is metered in in a quantity of 250 g/t of the total propylene feed dosage as well as cyclohexylmethyldimethoxy silane (donor) in a quantity of 21 g/t of the total propylene feed dosage, so that a molar ratio of alkyl/donor of 20/1 is brought about. According to consumption by polymerisation, further propylene is fed to the reactor from below in a pressure-regulated manner. This regulated monomer flow maintains the reactor pressure at 30 bar. The temperature regulation is effected such that per group (agitator pair), according to the temperature measured, liquid propylene for cooling is fed, e.g. laterally. The entire propylene used for cooling is fed to a cooler via the reactor lid, where it is condensed and fed again by a pump to the individual dosing locations. Hydrogen in a quantity of 62 g/t of the propylene feed is metered into the lowermost flow of the cooling gas. Hydrogen serves as a regulator for the molecular weight of the polymer. Propylene feed in a quantity of 5.1 t/h is likewise metered in at the bottom. The withdrawal of the polymer formed is effected continuously via a suitable withdrawal means such that the charge level of the reactor remains constant. Conventional methods for measuring the charge level of bulk materials may be employed for measuring the charge level. The average quantity of withdrawn polymer is 4.8 t/h, according to a mean residence time of the polymer of 1 h. The polymer obtained has the following properties:

MFI (melt flow index): 12 g/10 min. (acc. to ASTM D 1238)
XL (xylene-soluble content): 2.2% (acc. to ASTM D 5492)
Average bulk density: 440 g/l (acc. to ASTM D 1895)

The invention claimed is:

1. Apparatus for performing chemical and physical processes, wherein flowable substances are mixed together, comprising
   a cylindrical vessel with inlets and outlets,
   a central shaft and
   radial agitator blades arranged on the shaft, extending close to the wall, such that a gap between the blades and the wall is adapted to a size of particles passing through the reactor, characterized by the following features:
   a) the agitator blades are designed in a curved manner when viewed in the peripheral direction and
   b) are combined in pairs of agitator elements, positioned one above the other, to form groups,
   c) the blades of one element of the group being curved in a radially concave manner and the blades of the other element being curved in a radially convex manner and
   d) the blades are tapered towards their free ends.

2. Apparatus according to claim 1, wherein the curvature of the blades is spiral-shaped.

3. Apparatus according to claim 1, wherein the curvature is logarithmic or Archimedean.

4. Apparatus according to claim 1, wherein the blades are pitched in the axial direction for vertical feeding of substances in the axial direction.

5. Apparatus according to claim 4, wherein the blades of the agitator elements have pitching angles in opposite directions.

6. Apparatus according to claim 1, wherein barrier elements are provided between the groups of agitator elements.

7. Apparatus according to claim 1, wherein in the vessel wall spaced apart inlets and outlets are provided for feeding reaction components and/or coolants to the flowable substances.

8. Process for preparing polymers in a tubular reactor, the reaction components being moved through the reactor in an axial direction and in the course thereof being conveyed alternatingly towards and away from the reactor axis by pairs of agitator blades, curved in opposite directions, combined to form groups one above the other, substantially normal to the reactor axis, thereby intensely mixing the reaction components, the blades being tapered towards their free ends.

9. Process according to claim 8, wherein an olefin polymer is placed into the reactor and a monomer and a catalyst system are added to the latter.

10. Process according to claim 9, wherein the reactor content is cooled by adding a liquid monomer, the monomer evaporating in the course thereof and being withdrawn as a gaseous substance.

11. Process according to claim 10, wherein the liquid monomer is fed to the reactor successively at a plurality of locations, viewed in the direction of conveyance of the polymer.

12. Process according to claim 9, wherein from the outside or via a hollow shaft supporting the agitating blades or via the blades a barrier gas is introduced in sections into the reactor and radially withdrawn from the latter.

13. Process according to claim 9, wherein the product exiting from the reactor is passed into a second reactor,
   wherein the product is freed of residual monomers by scrubbing with an inert gas, and
   wherein the second reactor comprises agitator blades having at least two pair of agitator blades, curved in opposite directions, combined to form groups one above the other, substantially normal to the reactor axis, with the blades being tapered toward their free ends.

14. An apparatus according to claim 1, wherein the cylindrical vessel is a vertical vessel.

15. A process according to claim 13 wherein the inert gas is nitrogen.

* * * * *